United States Patent [19]

Frevel et al.

[11] 3,758,666
[45] Sept. 11, 1973

[54] REMOVAL OF CARBON MONOXIDE FROM AIR

[75] Inventors: Ludo K. Frevel, Midland; Leonard J. Kressley, Saginaw, both of Mich.

[73] Assignee: The Dow Chemical Company, Midland, Mich.

[22] Filed: Jan. 14, 1971

[21] Appl. No.: 106,555

[52] U.S. Cl. ................................. 423/247, 252/411
[51] Int. Cl. ............................................ B01d 53/34
[58] Field of Search............. 23/2 S, 4, 150, 204 M, 23/2 E; 252/411; 55/57, 58; 423/217, 219, 246, 247

[56] References Cited
UNITED STATES PATENTS

| 2,999,008 | 9/1961 | Diebold | 23/25 X |
| 3,481,987 | 12/1969 | Baile | 23/25 X |
| 2,384,065 | 9/1945 | Balear | 23/25 X |
| 3,346,484 | 10/1967 | Lewis | 252/411 R X |

FOREIGN PATENTS OR APPLICATIONS

| 436,906 | 10/1935 | Great Britain | 23/2 E |
| 1,128,993 | 2/1968 | Great Britain | 252/411 |

OTHER PUBLICATIONS

Lamb et al., "The Removal of Carbon Monoxide From Air," The Journal of Industrial & Engineering Chemistry, Vol. 12, No. 3, 1970, pgs. 213-221, page 215 relied upon.

Primary Examiner—Earl C. Thomas
Attorney—Griswold & Burdick, William R. Norris and Lloyd S. Jowanovitz

[57] ABSTRACT

Air containing carbon monoxide is contacted with a palladium catalyst under ambient conditions. It is believed that carbon monoxide removal is achieved by initial adsorption and subsequent oxidation to carbon dioxide on the catalyst surface. When the catalyst loses its effectiveness, it has been further discovered that simply reducing the pressure on the catalyst restores lost activity. The catalyst may also be reactivated by purging with a gas and heating.

9 Claims, No Drawings

REMOVAL OF CARBON MONOXIDE FROM AIR

The carbon monoxide pollution of air has been reported to exceed all other air pollutants combined. Recent publications indicate the carbon monoxide content of air frequently reaches 50 p.p.m. and may go as high as 140 p.p.m. for short periods of time in traffic jams. See "Chemical and Engineering News," Jan. 19, 1970.

Health authorities view this form of pollution with increasing concern in view of prognostications as to its long term effects on health. Even a very few parts per million, e.g., 10 p.p.m. of carbon monoxide in the atmosphere have been reported to adversely affect the nervous system.

It is manifest that techniques are needed for the control of carbon monoxide pollution of air and accordingly, it is a principal object of the invention to provide a technique for reducing the carbon monoxide content of air, e.g., in buildings, automobiles, aircraft and buses.

Much of currently available technology for removing carbon monoxide from air involves contacting the air with an oxidation catalyst at high temperatures.

A further object is to provide a process for removing carbon monoxide from air at ambient temperatures, thereby avoiding the need to elevate temperatures, which are often economically prohibitive for smaller unit operations.

A still further object is to provide a catalytic process for reducing the carbon monoxide content of air and further oxidizing it to relatively harmless carbon dioxide.

Another object is to provide an improved catalytic process in which catalyst regeneration is readily and rapidly achieved.

DESCRIPTION OF THE INVENTION

In a first embodiment, the instant invention comprises contacting air containing carbon monoxide with a palladium-based catalyst. The contacting is most conveniently, but not necessarily, carried out at ambient temperatures. Generally the ambient temperatures will be within the range from about 0° C up to about 35°C. Effective conversions are achieved at contact times as low as about 0.8 second. The contact times are not critical inasmuch as some reduction in the amount of carbon monoxide will occur in very short periods of contact.

Although other methods of contacting are possible, by far the most convenient technique involves flowing the air through a bed of the palladium-based catalyst. Effective reductions to relatively low residuals of carbon monoxide are achieved utilizing space velocities as great as 4,500 cubic feet of air per minute per cubic foot of catalyst. Lower space velocities, of course, improve the effectiveness of carbon monoxide conversion.

Unless the catalyst bed is sufficiently large relative to the amount of carbon monoxide being extracted from the air stream, carbon monoxide will break through the catalyst bed, necessitating catalyst reactivation. Although the instant invention is not predicated upon an explanation of the invention or its underlying theory, it is believed that the catalyst performs two functions in the instant process. The first is adsorption of the carbon monoxide from the gas stream. The second is catalyzation of oxidation of the carbon monoxide to carbon dioxide. Although the latter oxidation occurs simultaneously with adsorption, it is a relatively slower phenomenon and accordingly at some point, unless the rate of carbon monoxide input is less than the rate of oxidation, carbon monoxide will accumulate over the catalyst surface to the point that oxidation is hindered. At this point, catalyst regeneration is required for continued effective operation.

Catalyst regeneration can be achieved simply by holding the catalyst for a sufficient period of time to allow the oxidation reaction to catch up with adsorbed carbon monoxide. Such reactivation may be accelerated by heating the catalyst bed and/or purging it with another gas.

In a further embodiment of the instant invention, it has been discovered that the aforementioned palladium catalyst is readily and rapidly reactivated at ambient temperatures by simply reducing the pressure on the catalyst for a short time. Substantial pressure reduction, e.g., to less than about 15 millimeters of mercury, for periods of as little as 30 seconds has effectively renewed the catalyst. The reduction in pressure is readily accomplished as by directly evacuating the catalyst bed.

In a preferred mode of operation, a secondary vessel is evacuated gradually during the period in which the catalyst is in use. Upon carbon monoxide break through, or at some predetermined period gauged in relation to the normal capacity of the catalyst bed, the catalyst bed is evacuated by opening a line communicating with the secondary vessel. Within about 60 seconds, and generally about 30 seconds, the connection to the secondary vacuum container can be closed and the air stream to be purified again fed to the catalyst bed.

The palladium based catalyst used herein comprises metallic palladium and alloys thereof in a finely divided form. The catalyst may consist of just the metal itself but preferably the metal has been deposited upon an inert catalyst support. A preferred palladium-based catalyst is described in U.S. Pat. No. 2,802,889. In this patent, the palladium has been alloyed or mixed with up to 40 percent by weight of one or more of copper, silver or gold.

In the practice of the instant invention, it is essential that the catalyst support be essentially nonhydrophilic. In this respect, the suitability of a particular support can be empirically determined by passing 1,000 volumes of air, of at least 90 percent relative humidity, through 1 volume of the catalyst support material, which has been previously dried at 120°C. for 2 hours. If the weight pickup is less than about 3 percent by weight, the catalyst support is suitable for the purposes of the instant invention. Particular catalyst supports useful in the instant invention include pumice, diatomaceous earth, alpha alumina and kappa alumina.

Preparation of the catalyst is carried out by known techniques. Usually, the inert support is impregnated with an aqueous solution of the necessary metal nitrates. The resulting mixture is heated to drive off water and roasted to convert the nitrates to oxides. Subsequent hydrogenation reduces the metal oxides, which have impregnated the supporting material to the desired catalytically active colloid metal deposits. Suitable catalytic compositions are also prepared from palladium and alloys thereof by blending together the finely divided metal with a support material and a binder material. The resulting mixture is then pelletized. In most operations, the metal content of the finished catalyst will range within the range from about 0.05 up to about 5 percent by weight of the total composition. The total porosity of the metal-coated catalyst is preferably at least about 25 percent.

The practice of the instant invention will be better understood by reference to the following specific embodiments.

EXAMPLE 1

A palladium based catalyst was prepared as follows: To 5 milliliters of a 10 percent by weight solution of $Pd(NO_3)_2$ in water was added 65 ml. of water and into the resulting dilute solution was dissolved 0.016 gram $AgNO_3$. About 100 grams of diatomaceous earth, in the form of broken granules, approximately ⅛-inch diameter was impregnated with 70 ml. of the palladium nitrate-silver nitrate solution. The wetted granules were dried at about 100°C. with frequent stirring. The dry mixture was then roasted in air at 325°–350°C. and subsequently reduced in a stream of gas composed of 95 percent $N_2$ and 5 percent $H_2$ at about 100°C.

Into a glass tube (15 mm I.D. × 110 mm length) was placed 6.3 grams of a reduced catalyst prepared as described above. It contained 0.2 percent by weight of a metal deposit consisting of, on a weight basis, 99 percent Pd. and 1 percent Ag on diatomaceous earth particles sized 8 to 18 mesh (U. S. standard series). Air containing 50 ppm CO was passed through the bed at rates up to 350 ml/min. (23°, 1 atm.). The gas effluent from the catalyst bed was passed through a trap (−80°C.) to remove moisture and then into a 12 liter White infrared cell having an optical path length set at 54 meters and yielding a sensitivity of 0.2 ppm CO. At ambient conditions (23°C., 1 atm.), the Pd-catalyst effectively oxidized at least 98 percent of the CO to $CO_2$ at a space velocity of 1,080 reciprocal hours.

EXAMPLE 2

In another run, 7.6 grams of kappa alumina containing 0.3 percent Pd. was used in a manner similar to the above Example. Air with 50 ppm CO was passed through the 10 ml bed at rates up to 750 ml/min. (23°C., 1 atm.) without a CO-breakthrough (<1 ppm CO in effluent). Again, substantially complete oxidation of CO to $CO_2$ was achieved at room temperature at a space velocity of 4,500 reciprocal hours.

EXAMPLE 3

A pyrex tube having an inside diameter of approximately 32 millimeters was loaded to a depth of about 50 millimeters with 14.04 grams of a palladium catalyst having a particle size within the range of 8 to 18 mesh (U. S. Standard series). The palladium catalyst was an alloy of palladium containing 1 percent silver, which alloy had been colloidally deposited on diatomaceous earth in a manner similar to that described in Example 1.

A stream of air containing 50 parts per million by volume of carbon monoxide was then passed through the bed of palladium catalyst at the rate of 200 milliliters per minute under an ambient temperature of 23°C. and atmospheric pressure. The effluent from the catalyst bed was continuously analyzed for carbon monoxide by infrared detection and found to contain less than 1 part per million by volume of carbon monoxide for a period of 50 minutes. At the point of carbon monoxide breakthrough (carbon monoxide content in the effluent began to significantly increase), the catalyst bed was evacuated for a period of about 2 minutes at a vacuum of about 1 millimeter of mercury. This reactivated the catalyst and the flow of carbon monoxide containing air was continued. The entire sequence was repeated for a series of seven additional cycles over which the carbon monoxide breakthrough occurred after 52, 68, 70, 60, 65, 70, and 65 minute intervals.

Proceeding in a manner similar to that described above, except that the catalyst bed was maintained at a temperature of 49°C., carbon monoxide removal was effected continuously for an extended period of at least about 20 hours with a gas flow rate of 500 milliliters per minute (23°C. atmospheric pressure).

Other palladium catalysts that may be employed in finely divided form, preferably supported upon a nonhydrophilic, inert catalyst support, include, for example, the following alloys, wherein the indicated percentages are based on the weight of the active metal components only: 95% Pd – 5% Ag, 95% Pd – 5% Au, 95% Pd – 5% Pt, 70% Pd – 30% Cu and 100% Pd.

Although it is most convenient, as illustrated in the foregoing examples, to operate at atmospheric pressure, higher or lower pressures may be employed as desired. Although some benefit is obtained while operating at space velocities as high as 4,500 reciprocal hours, most effective results are obtained, when using a palladium catalyst containing from about 0.15 to about 1.5 percent by weight of the metal on an inert support, at space velocities less than about 3,000 reciprocal hours.

Optimal catalysts will have a porosity of at least about 25 percent, as determined by mercury porosimetry. The latter measurement is carried out according to the technique described by Frevel and Kressley, "Modifications in Mercury Porosimetry," Analytical Chemistry, Vol. 35, page 1,492, (September, 1963).

What is claimed is:

1. A method which comprises contacting a stream of air containing carbon monoxide with a palladium-based catalyst at a temperature less than about 35°C. at atmospheric pressure or greater, stopping the flow of said stream in contact with said catalyst when the catalyst bed becomes at least partially inactive, reducing the pressure on the catalyst to a subatmospheric pressure for a period of time sufficient to reactivate said bed and again contacting said stream of air with said catalyst, whereby the carbon monoxide content of the air is reduced.

2. A method as in claim 1 wherein the contacting is carried out by flowing the air through a bed of the palladium-based catalyst at ambient temperature.

3. A method as in claim 2 wherein the palladium-based catalyst comprises colloidally dispersed palladium or an alloy thereof, supported upon an essentially nonhydrophilic inert catalyst support.

4. A method as in claim 3 wherein the palladium catalyst comprises from about 0.05 to about 5 weight percent of palladium or an alloy thereof with Group IB metals colloidally dispersed on a nonhydrophilic support.

5. A method as in claim 2 wherein the palladium-based catalyst comprises from about 0.15 to about 1.5 weight percent of colloidally dispersed palladium, or an alloy thereof, on diatomaceous earth, kappa alumina or alpha alumina or a mixture of two or more of the foregoing.

6. A method as in claim 1 wherein the palladium-based catalyst has a porosity of at least about 25 percent.

7. A method as in claim 1 wherein the active metal component of the palladium-based catalyst comprises at least about 95% Pd and up to about 5% Ag.

8. A method as in claim 1 wherein the pressure reduction is to less than about 15 millimeters of mercury.

9. A method as in claim 1 wherein the ambient temperature is within the range of about 0° to 35°C.

* * * * *

UNITED STATES PATENT OFFICE
CERTIFICATE OF CORRECTION

Patent No. 3,758,666                    Dated September 18, 1973

Inventor(s) Ludo K. Frevel, et al.

It is certified that error appears in the above-identified patent and that said Letters Patent are hereby corrected as shown below:

Column 1, line 54, "minute" should read -- hour --.

Signed and sealed this 30th day of April 1974.

(SEAL)
Attest:

EDWARD M. FLETCHER, JR.                C. MARSHALL DANN
Attesting Officer                       Commissioner of Patents